(12) United States Patent
Anderson et al.

(10) Patent No.: US 8,011,495 B2
(45) Date of Patent: Sep. 6, 2011

(54) TRANSFER DEVICE METERING APPARATUS AND METHODS

(75) Inventors: Vernon J. Anderson, Alexandria, MN (US); Michael Paul Bauer, Alexandria, MN (US); Gene Allen Corle, Farwell, MN (US); Christopher Todd Davis, Carlos, MN (US); Simin Jiang, Alexandria, MN (US); Irvan Leo Pazdernik, Alexandria, MN (US); Thomas Harold Peterman, Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 12/675,451

(22) PCT Filed: Aug. 27, 2008

(86) PCT No.: PCT/US2008/074424
§ 371 (c)(1),
(2), (4) Date: Apr. 16, 2010

(87) PCT Pub. No.: WO2009/029646
PCT Pub. Date: Mar. 5, 2009

(65) Prior Publication Data
US 2010/0243407 A1 Sep. 30, 2010

Related U.S. Application Data

(60) Provisional application No. 60/968,268, filed on Aug. 27, 2007.

(51) Int. Cl.
*B65G 47/26* (2006.01)
(52) U.S. Cl. ................. 198/419.2; 198/461.3
(58) Field of Classification Search ........... 198/419.2, 198/461.2, 461.3
See application file for complete search history.

(56) References Cited

U.S. PATENT DOCUMENTS

| | | | | |
|---|---|---|---|---|
| 3,403,772 A | * | 10/1968 | Vadas | 198/419.2 |
| 3,938,650 A | * | 2/1976 | Holt | 198/419.3 |
| 4,771,877 A | * | 9/1988 | Langen | 198/461.3 |
| 4,960,198 A | * | 10/1990 | Hogenkamp | 198/419.2 |
| 5,012,916 A | * | 5/1991 | Cruver | 198/419.3 |
| 5,667,055 A | | 9/1997 | Gambetti | |
| 2003/0183484 A1 | | 10/2003 | Peterman et al. | |

FOREIGN PATENT DOCUMENTS

GB 2025884 * 1/1980

* cited by examiner

*Primary Examiner* — James R Bidwell
(74) *Attorney, Agent, or Firm* — Alan Kamrath; Kamrath & Associates PA (57) ABSTRACT

A product metering apparatus (10) includes a first product conveyance mechanism (12) conveying product in a continuous stream. A platform (42) supports product and is movable along a closed path between a loading position adjacent to the first product conveyance mechanism (12) and a transfer position adjacent to an output in the form of a second product conveyance mechanism (22) spaced from the first product conveyance mechanism (12) in the conveying direction. The platform (42) in the loading position receives the product in the continuous stream from the first product conveyance mechanism (12) and is then accelerated to a speed greater than the first product conveyance mechanism (12) creating a gap between the product supported on the platform (42) and the product remaining in the continuous stream on the first product conveyance mechanism (12). A sweep bar (52ba) is inserted into the gap and abuts with the product on the platform (42) for assisting transfer of the product on the platform (42) to the output.

20 Claims, 5 Drawing Sheets

FIG. 2

TRANSFER DEVICE METERING APPARATUS AND METHODS

CROSS REFERENCE

The present application claims benefit of U.S. Application No. 60/968,268 filed on Aug. 27, 2007.

BACKGROUND

The present invention generally relates to apparatus and methods for metering product from a continuous stream into a product group and/or pack pattern, particularly to metering apparatus and methods not requiring windows between product in the continuous stream, more particularly to metering apparatus and methods which are versatile to meter a wide variety of product such as cans, plastic bottles, jars, cartons, bundles, or trays, and specifically to metering apparatus and methods where product is metered by moving a transfer device underneath a product group.

The apparatus and methods disclosed in U.S. Pat. No. 6,843,360 represented a major advancement over prior metering methods including but not limited to pin metering systems and have enjoyed considerable market success. However, a need continues to exist to improve the operation of metering systems having increased operational speed, better product stability, reduced wear and maintenance requirements, and trouble free operation.

SUMMARY

The present invention solves this need and other problems in the field of metering apparatus and methods by providing, in most preferred aspects, a transfer device upon which lead product of a continuous stream of product moving at a first conveying speed is transferred. The transfer device and the product thereon are accelerated to be spaced from the continuous stream of product and to a second conveying speed greater than the first conveying speed. After acceleration, product on the transfer device is transferred to a receiving conveyor moving at the second conveying speed.

In a preferred form, product is conveyed in a continuous stream in a conveying direction onto a first platform in the most preferred form by a first product conveyance mechanism. The first platform is movable between a loading position adjacent to the first product conveyance mechanism and a transfer position adjacent to an output spaced from the first product conveyance mechanism in the conveying direction. In the most preferred form, the output is in the form of a second product conveyance mechanism moving in a direction collinear to the conveying direction at a speed equal to the speed of the first platform at the transfer position. The first platform in the loading position receives product in the continuous stream from the first product conveyance mechanism. After product of the continuous stream has moved onto the first platform, the first platform moves from the loading position to the transfer position at a speed greater than the first product conveyance mechanism creating a gap between the product supported on the first platform and the product remaining in the continuous stream on the first product conveyance mechanism. The product supported on the first platform in the transfer position is transferred onto the output.

In a most preferred form, the first platform is supported by and moves together with a bearing surface that moves in a closed path having arcuate portions. Furthermore, one or more second platforms also move in the closed path and, in the preferred form, in an overlapping relationship. The first and second platforms are formed of a material with a flexibility to conform to and follow the arcuate portions of the closed path. Each of the first and second platforms initially moves at a first speed in the conveying direction equal to a speed of the product of the continuous stream on the first product conveyance mechanism. A sweep bar is inserted into the gap between the product on the first platform and the product remaining in the continuous stream of product between the loading position and the transfer position. The sweep bar abuts with the product on the first platform and assists transfer of product from the first platform onto the output.

The present invention provides novel apparatus and methods for metering product.

The present invention provides such novel metering apparatus and methods not requiring the presentation of windows between abutting product.

The present invention provides such novel metering apparatus and methods versatile enough to meter product of different sizes and shapes including but not limited to cans, bottles, jars, cartons, bundles and trays.

The present invention provides such novel metering apparatus and methods which can be easily changed over between different product and/or different product group sizes.

The present invention provides such novel metering apparatus and methods allowing nesting of products in the continuous stream of product to minimize product surge.

The present invention provides such novel metering apparatus and methods minimizing the number and complexity of components, with few high wear components.

The present invention provides such novel metering apparatus and methods which eliminate or control physical registration forces during the metering operation.

The present invention provides such novel metering apparatus and methods allowing easy access to the product from the top and side and to the bottom of the apparatus for maintenance and cleaning.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
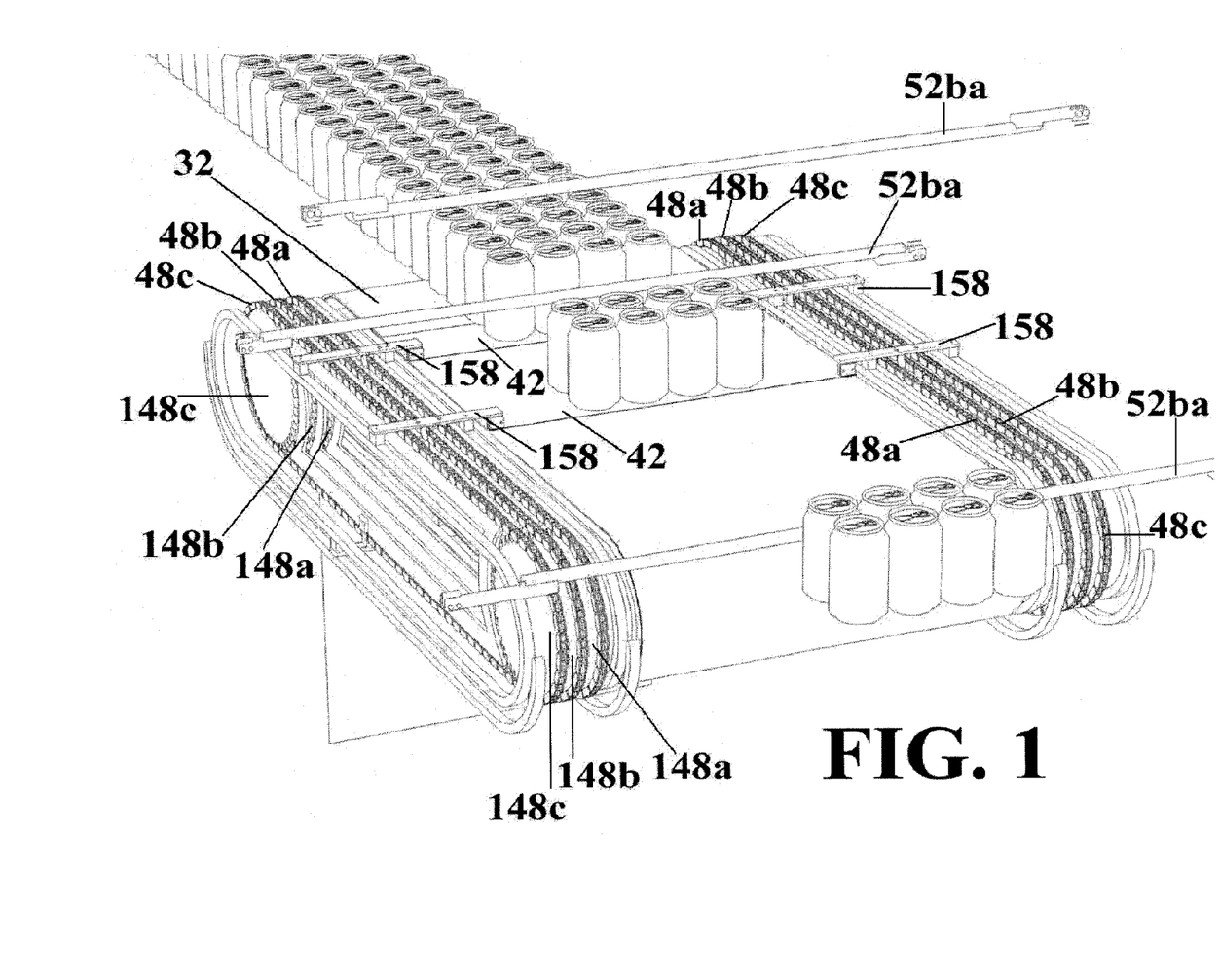
FIG. 1 shows a perspective view of a metering apparatus utilizing preferred methods according to the preferred teachings of the present invention, with portions being removed for ease of illustration.
Figure 2:
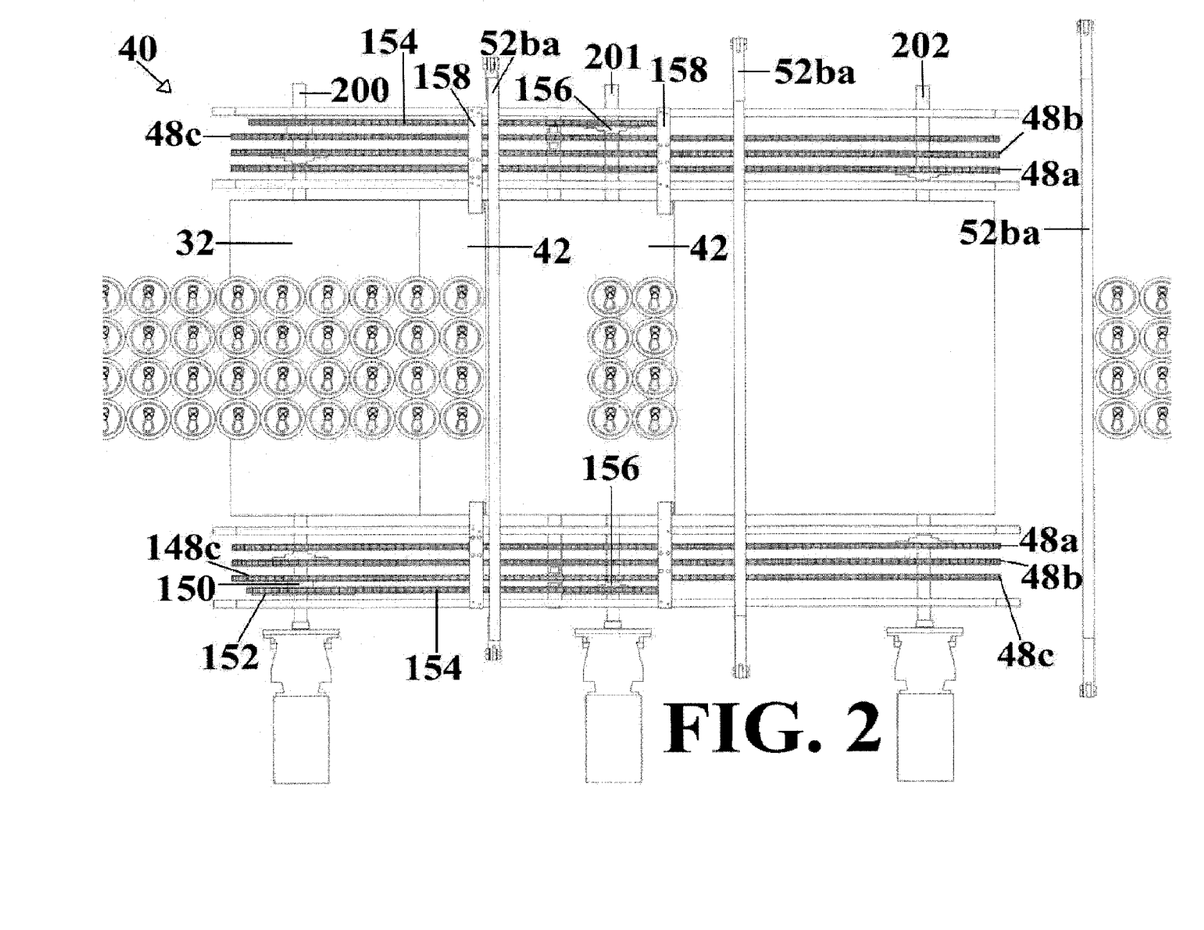
FIG. 2 shows a top view of the metering apparatus of FIG. 1.
Figure 3A:
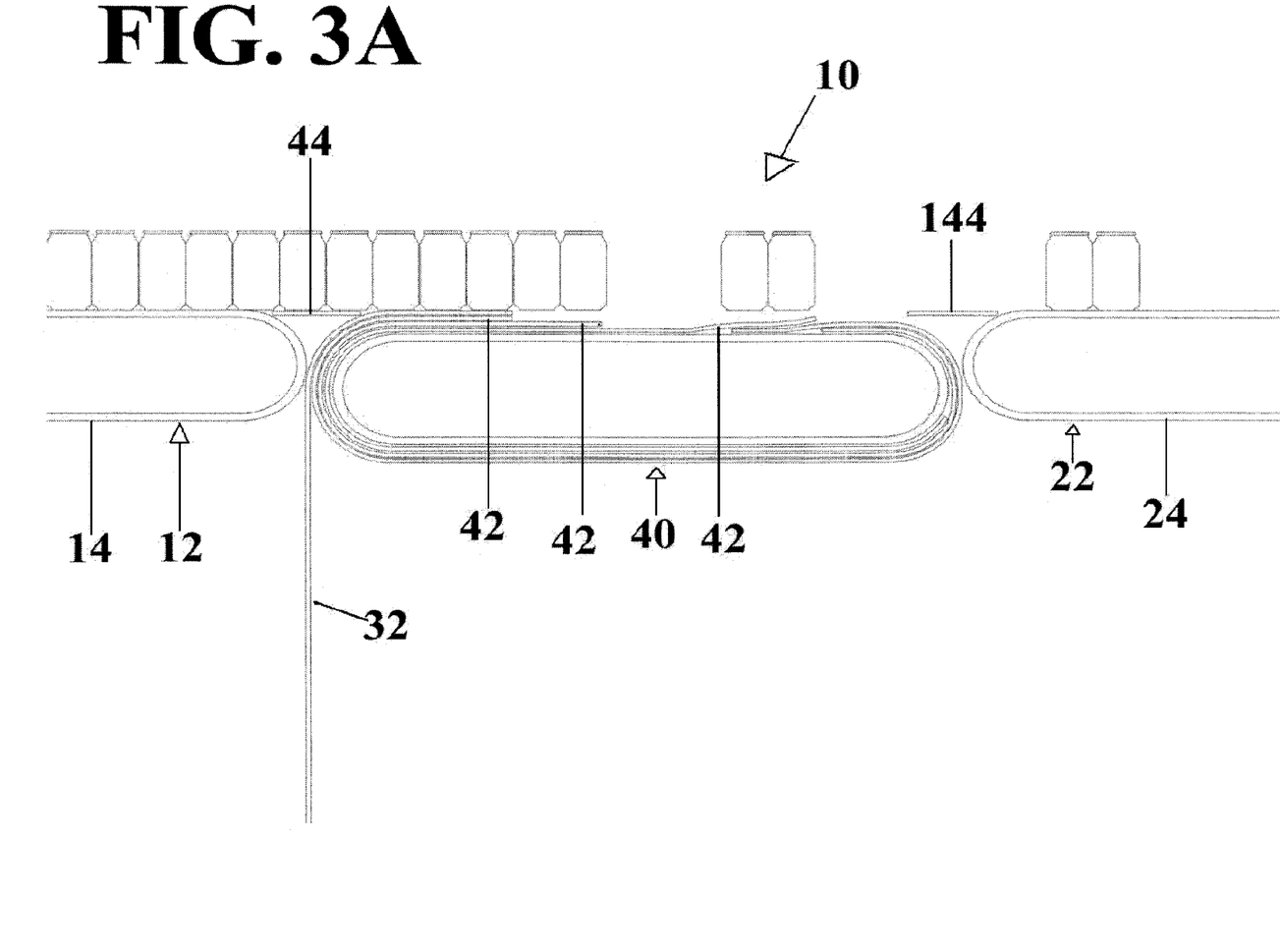
FIGS. 3A-3C show diagrammatic side views illustrating the preferred methods according to the preferred teachings of the present invention.
Figure 3B:
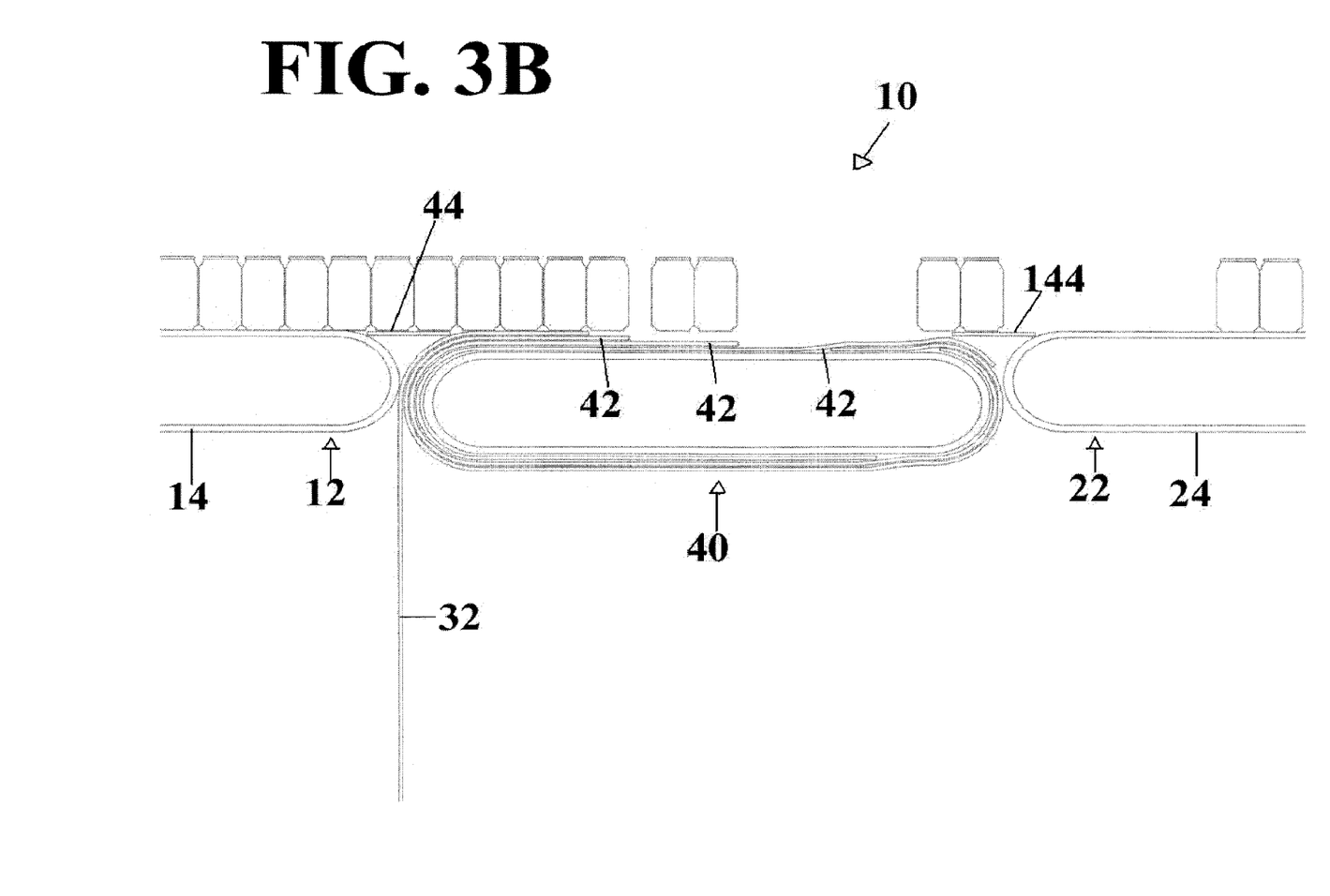
Figure 3C:
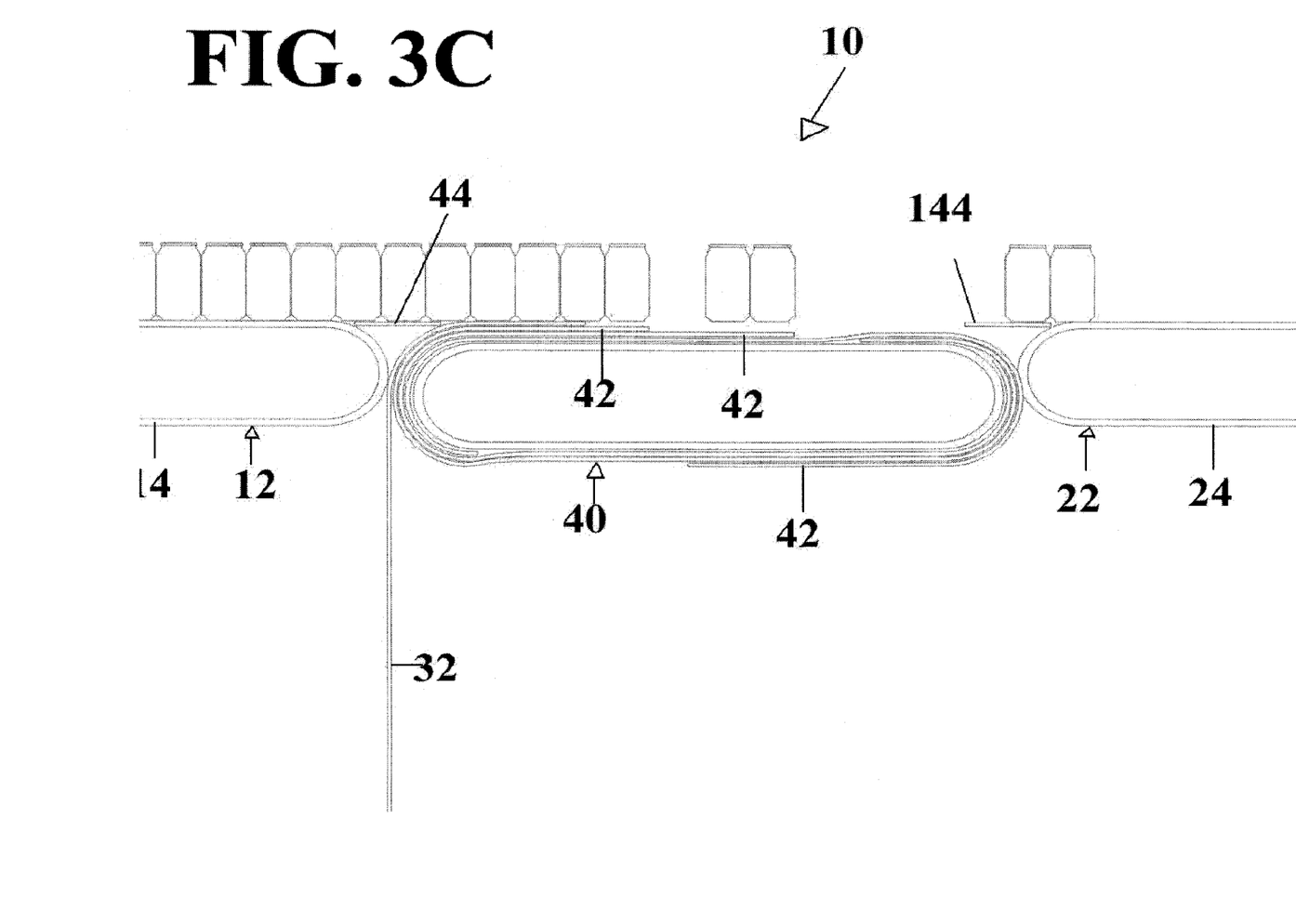

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side," "end," "bottom," "first," "second," "upstream," "downstream," and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

An apparatus for metering product and in particular to apparatus which collates and separates groups of product in preparation for various types of packaging of the most preferred form is shown in the drawings and generally designated 10. Generally, apparatus 10 includes first and second product conveyance mechanisms which are independently driven for moving product in a conveying direction. In the most preferred form, the conveying direction of the first and second product conveyance mechanisms are collinear to each other, with the product being transferred from the first product conveyance mechanism where they are bunched together unto a metering mechanism where they are separated, typically into groups. Separated groups of products are transferred from the metering mechanism unto the second product conveyance mechanism. However, it should be recognized that the first and second product conveyance mechanisms could have other arrangements including linearly parallel, perpendicular or at a nesting angle of nested product. In the most preferred form, the first product conveyance mechanism is shown as an infeed conveyor 12 which is driven at variable speeds such as by a servo motor. In the preferred form, conveyor 12 includes an endless belt 14 including an upper run extending between an upstream roller and a downstream roller. It should be realized that conveyor 12 can include one or more additional rollers, with one or more of the rollers being rotated such as by a servo motor to cause movement of belt 14. In the most preferred form, belt 14 is driven to move continuously so that product is conveyed on infeed conveyor 12 in a continuous stream at a constant speed.

In the most preferred form, the second product conveyance mechanism is shown as a receiving conveyor 22 which is separately driven from conveyor 12 and typically in a continuous manner such as by a servo motor. In the preferred form, conveyor 22 includes an endless belt 24 including an upper run extending between an upstream roller and a downstream roller. It should be realized that conveyor 22 can include one or more additional rollers, with one or more of the rollers being rotated such as by a servo motor to cause movement of belt 24. In the most preferred form, the upper runs of belts 14 and 24 are in the same plane.

In the most preferred form shown, metering mechanism 40 includes multiple, overlapping, flexible platforms or flexible transfer devices 42 supported by a bearing surface. The platforms 42 move from upstream to downstream in a closed loop or path having arcuate portions. Specifically, each platform 42 moves from a loading position adjacent to the infeed conveyor 12 and a transfer position adjacent to the receiving conveyor 22. In the loading position, product on the infeed conveyor 12 is moved onto the platform 42. In the transfer position, product supported on platform 42 is transferred onto the receiving conveyor 22. The platforms 42 are formed of material with a flexibility to conform to and follow the arcuate portions of the closed path. The leading edge of each platform 42 is attached to one of multiple pairs of a drive mechanism. In the preferred form shown, the drive mechanism includes first, second, and third shafts 200, 201, 202 which are in a spaced, parallel relation and individually driven such as by servo motors. First, second and third pairs of roller chains 48a, 48b and 48c extend around sprockets on shafts 200 and 202. The sprockets 148a of the inner pair of chains 48a are rotatably fixed to shaft 202 and are rotatable on shaft 200. The sprockets 148b of the second pair of chains 48b are rotatably fixed to shaft 200 and are rotatable on shaft 202. The sprockets 148c of the outer pairs of chain 48c are rotatable on shafts 200 and 202, with the sprocket 148c on shaft 200 being suitably driven such as by being interconnected to a hub 150 rotatable on shaft 200 and interconnected to a drive sprocket 152 rotatable upon shaft 200. Sprocket 152 is suitably driven such as by a roller chain 154 extending around sprocket 156 fixed to shaft 201. A bracket 158 extends from adjacent each side of the leading edge of the platform 42 to one of the roller chains 48a, 48b, and 48c.

In the preferred form shown, the length of each platform 42 is such that it is always overlapped by the leading edge of the trailing platform 42. Each platform 42 initially moves downstream at the speed of the infeed conveyor 12. Product is conveyed onto the platform 42 in the loading position over a transfer plate 44 from the infeed conveyor 12. An adjustable length transfer device 32 controls the point where the product comes in contact with a platform 42. In the preferred form shown, the transfer device 32 is in the form of a flexible sheet extending around the upstream portion of the closed loop of the movement path of the platforms 42.

When the desired product pattern has been conveyed onto the platform 42 in the loading position in the preferred form shown, the platform 42 accelerates in the conveying direction, separating the pack pattern from the continuous stream of product. Namely, a gap is created between the product on the platform 42 and the product remaining in the continuous stream of product on the infeed conveyor 12. A sweep bar 52ba moves down from an overhead path to enter the space created and abuts with the product on the platform 42 to push the product from the platform 42 and over a transfer plate 144 unto the receiving conveyor 22. The mechanism for inserting, moving and removing the sweep bars 52ba is not shown in the drawings for ease of illustration and can take a variety of forms as desired.

When the product group, supported by the platform 42, reaches the transfer position of the closed loop, the downstream movement is approximately equal to the receiving conveyor 22. Product on the platform 42 in the transfer position is conveyed across the transfer plate 144, assisted by the sweep bar 52ba, and onto the receiving conveyor 22 moving at a speed generally equal to the speed of the sweep bar 52ba. The platform 42 continues around the closed loop to the loading position of the metering mechanism 40 where the leading edge of the platform 42 is introduced into the product stream at the correct interval to support and form the next product group.

Change over from one pack pattern to another and/or product dimension is accomplished by moving the downstream end of the adjustable length transfer device 32 either up or downstream and changing the dimension between the leading edges of the platforms 42.

Now that the basic construction of apparatus 10 according to the preferred teachings of the present invention has been set forth, a method of operation can be explained, and advantages obtained by the present invention can be highlighted. In the preferred form shown, a first platform 42 is moving at a speed equal to the speed of the first product conveyance mechanism until a desired product group is moved over the transfer plate 44 and the transfer device 32 onto the first platform 42. Then, a second platform 42 is moved into the loading position and moves as fast as the first product conveyance mechanism to receive a second product group. The first platform 42 is accelerated relative to the product remaining in the continuous stream and to the product on the second platform 42. This allows continuous conveying of product at a constant speed and obtains a higher metering rate. It can be appreciated that overlap between the platforms 42 is greater when the length of product grouping is less and shorter when the length of product grouping is more. Changeover can occur without changing parts but by simply adjusting when the second platform 42 starts receiving product or by adjusting the amount that the first platform 42 is exposed (or the overlap). Although overlapping platforms 42 is believed to produce synergistic results, the platforms 42 can be arranged with the leading edge of the second platform 42 abutting or closely adjacent to the trailing edge of the first platform 42 according to the teachings of the present invention to allow continuous conveyance such as in applications where changeover is not needed.

Although three platforms 42 are shown in the preferred form, two or more than three platforms 42 can be utilized and still obtain the advantage of continuous motion according to the preferred teachings of the present invention. Advantages of utilizing three or more platforms 42 of the preferred form shown are that the length of the closed path can be longer and that the platforms 42 do not have to travel at a high rate of speed from the transfer position back to the loading position.

Although continuous motion is possible using multiple platforms 42, an apparatus and methods utilizing a single platform can be constructed according to the teachings of the present invention whereby a gap is created by relative acceleration of the platform 42 by stopping of the first product conveyance mechanism.

The advantage of the closed path of the preferred form shown is that the platform 42 always travels in the same direction and never in the opposite direction so that vibration, shock, etc. are avoided. However, if high speed operation is not a concern, an apparatus could be constructed where the platform 42 accelerates product when traveling between the loading and transfer positions according to the preferred teachings of the present invention but does not travel along a closed path between the loading and transfer positions such as by reciprocation or other types of movements.

Since each platform 42 is in motion at the same rate as the incoming product in the preferred form shown, there is less chance of tipping of product as the result of product being moved onto the platform 42. Furthermore, there is minimal scuffing of product as product does not slide onto or off the platform 42 in the preferred form shown. Furthermore, higher metering speeds are attainable, since product does not have to accelerate after contact with a conveying surface and since product is conveyed onto each platform 42. Further, product patterns are accelerated as a group, within the stability "envelope" of the product. This gives a consistent gap for introduction of the sweep bar 52*ba*. Further, apparatus 10 according to the preferred teachings of the present invention is open and, thus, allows easy access to the product from the top and side and to the bottom of apparatus 10 for maintenance and cleaning as well as jam clearance. Furthermore, apparatus 10 has no pins, etc. to puncture or deform product. Thus, waste and clean up are reduced.

Apparatus 10 and methods according to the preferred teachings of the present invention do not need the presentation of windows between abutting product required in conventional designs. Furthermore, apparatus 10 and methods according to the preferred teachings of the present invention are versatile enough to meter product of different sizes and shapes including but not limited to cans, bottles, jars, cartons, bundles and trays. Furthermore, apparatus 10 and methods according to the preferred teachings of the present invention can be easily changed over between different product and/or different product group sizes. Furthermore, apparatus 10 and methods according to the preferred teachings of the present invention allow nesting of products in the continuous stream of product to minimize product surge. Further, apparatus 10 and methods according to the preferred teachings of the present invention minimize the number and complexity of components, with few high wear components. Further, apparatus 10 and methods according to the preferred teachings of the present invention eliminate or control physical registration forces during the metering operation.

Now that the basic teachings of the present invention have been explained, many extensions and variations will be obvious to one having ordinary skill in the art. For example, the product group does not have to directly engage the platform 42 according to the preferred teachings of the present invention. As an example, a carton blank or the like can be placed on the platform 42 before it reaches its loading position so that product is pushed onto the carton blank located on the platform 42. Thus, the product group leaves the metering mechanism 40 on the carton blank.

Furthermore, although the output is shown in the preferred form of the second product conveyance mechanism, the output of apparatus 10 according to the preferred teachings of the present invention can be a stacker or a platform for pushing the product group onto or into a carton blank, a container, a package, or the like. Further, the product group can be in the desired pack pattern as shown so that the product group is directly sent to the next station for packaging. However, the product group may not be in the desired pack pattern according to the teachings of the present invention. In this case, the product group could be sent by the second product conveyance mechanism to a station or device for arranging the product group in the desired pack pattern before packaging.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A method for metering products comprising:
   moving product in a continuous stream in a conveying direction onto a first platform;
   accelerating the first platform with product thereon in the conveying direction relative to the product remaining in the continuous stream creating a gap between the product on the first platform and the product remaining in the continuous stream of product;
   transferring the product from the first platform to an output after creating the gap between the product on the first platform and the product remaining in the continuous stream of product; and
   moving the product remaining in the continuous stream in the conveying direction onto a second platform initially moving at a speed in the conveying direction less than the first platform when the first platform with the product thereon is accelerated.

2. The method as claimed in claim 1, with accelerating the first platform including moving the first platform in a closed path.

3. The method as claimed in claim 2, with moving the first platform comprising moving the first platform in the closed path including arcuate portions, with moving the first platform comprising moving the first platform formed of material with a flexibility to conform to and follow the arcuate portions of the closed path.

4. The method as claimed in claim 3, with moving the product in the continuous stream including moving the product in the continuous stream at a first speed onto the first platform initially moving at the first speed in the conveying direction.

5. The method as claimed in claim 4, with moving the product remaining in the continuous stream including moving the product at the first speed in the conveying direction onto the second platform initially moving at the first speed in the conveying direction when the first platform with the product thereon is accelerated, with moving the product in the continuous stream comprising continuously moving the product in the continuous stream at the first speed.

6. The method as claimed in claim 5, with moving the product remaining in the continuous stream comprising moving the product remaining in the continuous stream onto the second platform overlapping the first platform.

7. The method as claimed in claim 6, further comprising inserting a sweep bar into the gap between the product on the first platform and the product remaining in the continuous stream and abutting the sweep bar with the product on the first platform before transferring the product from the first platform and for assisting the transfer of the product on the first platform onto the output.

8. The method as claimed in claim 7, with transferring the product from the first platform to the output including moving a product conveyance mechanism downstream of the first platform at a second speed generally equal to a speed of the sweep bar.

9. The method as claimed in claim 8, with moving the product conveyance mechanism including moving the product conveyance mechanism in a direction collinear to the conveying direction.

10. Apparatus for metering products comprising, in combination:
   a first product conveyance mechanism conveying product in a continuous stream in a conveying direction;
   an output spaced from the first product conveyance mechanism in the conveying direction;
   a first platform for supporting product, with the first platform movable between a loading position adjacent to the first product conveyance mechanism and a transfer position adjacent to the output, with the first platform in the loading position receiving product in the continuous stream from the first conveyance mechanism, with the first platform moving from the loading position to the transfer position at a speed greater than the first product conveyance mechanism after product of the continuous stream has moved onto the first platform creating a gap between the product supported on the first platform and the product remaining in the continuous stream on the first product conveyance mechanism, with the product supported on the first platform in the transfer position being transferred onto the output; and
   a second platform movable in the closed path between the loading position and the transfer position, with the second platform initially moving at a speed in the conveying direction less than the first platform when the first platform with the product thereon is accelerated, with the second platform in the loading position receiving the product remaining in the continuous stream after the first platform with the product thereon is accelerated, with the second platform moving from the loading position to the transfer position at a speed greater than the first product conveyance mechanism after product of the continuous stream has moved onto the second platform creating a gap between the product supported on the second platform and the product remaining in the continuous stream on the first product conveyance mechanism, with the product supported on the second platform in the transfer position being transferred onto the output.

11. The product metering apparatus as claimed in claim 10, further comprising, in combination: a bearing surface moving in a closed path, with the first platform being supported by and moving together with the bearing surface in the closed path.

12. The product metering apparatus as claimed in claim 11, with the closed path including arcuate portions, and with the first platform formed of material with a flexibility to conform to and follow the arcuate portions of the closed path.

13. The product metering apparatus as claimed in claim 12, with the first platform initially moving at a first speed in the conveying direction equal to a speed of the product of the continuous stream on the first product conveyance mechanism.

14. The product metering apparatus as claimed in claim 13, with the second platform initially moving at the first speed in the conveying direction when the first platform with the product thereon is accelerated, and with the first product conveyance mechanism continuously moving at the first speed.

15. The product metering apparatus as claimed in claim 14, with the second platform in the loading position overlapped with the first platform.

16. The product metering apparatus as claimed in claim 14, further comprising, in combination: a drive mechanism including:
   first and second pairs of shafts spaced in a spaced, parallel relation and individually driven, with each of the first and second pairs of shafts extending in a direction perpendicular to the conveying direction and including first and second ends on two sides of the closed path;
   sprockets mounted on the first ends and the second ends of the first and second pairs of shafts; and
   first and second chains each mounted around sprockets of the first and second pairs of shafts and connected to a leading edge of one of the first and second platforms.

17. The product metering apparatus as claimed in claim 16, further comprising, in combination: a sweep bar inserted into the gap between the product on the first platform and the product remaining in the continuous stream of product between the loading position and the transfer position, with the sweep bar abutting with the product on the first platform and assisting transfer of the product on the first platform to the output.

18. The product metering apparatus as claimed in claim 17, with the output comprising a second product conveyance mechanism downstream of the first platform, with the second product conveyance mechanism moving at a speed generally equal to a speed of the sweep bar.

19. The product metering apparatus as claimed in claim 18, with the second product conveyance mechanism moving in a direction collinear to the conveying direction.

20. Apparatus for metering products comprising, in combination:
   a first product conveyance mechanism conveying product in a continuous stream in a conveying direction;
   an output spaced from the first product conveyance mechanism in the conveying direction;
   a first platform for supporting product, with the first platform movable between a loading position adjacent to the first product conveyance mechanism and a transfer position adjacent to the output, with the first platform in the loading position receiving product in the continuous stream from the first conveyance mechanism, with the first platform moving from the loading position to the transfer position at a speed greater than the first product conveyance mechanism after product of the continuous stream has moved onto the first platform creating a gap between the product supported on the first platform and the product remaining in the continuous stream on the first product conveyance mechanism, with the product supported on the first platform in the transfer position being transferred onto the output;

a bearing surface moving in a closed path, with the first platform being supported by and moving together with the bearing surface in the closed path, with the closed path including arcuate portions, and with the first platform formed of material with a flexibility to conform to and follow the arcuate portions of the closed path;

a length-adjustable flexible sheet having an end extending around an upstream portion of the closed path, with the length-adjustable flexible sheet controlling a point where the continuous stream of product from the first product conveyance mechanism comes in contact with the first platform; and a transfer plate extending between the upstream portion of the closed path and a downstream portion of the first product conveyance mechanism, and with the first product conveyance mechanism moving the product in the continuous stream across the transfer plate and the end of the length-adjustable flexible sheet onto the first platform.

* * * * *